(12) United States Patent
Shelekhov

(10) Patent No.: US 8,058,347 B2
(45) Date of Patent: Nov. 15, 2011

(54) COMPOSITES AND METHODS OF MAKING AND USING THE COMPOSITES

(75) Inventor: Nikita Sergeevich Shelekhov, Avon (FR)

(73) Assignee: Corning Incorporated, Corning, NY (US)

( * ) Notice: Subject to any disclaimer, the term of this patent is extended or adjusted under 35 U.S.C. 154(b) by 164 days.

(21) Appl. No.: 12/702,516

(22) Filed: Feb. 9, 2010

(65) Prior Publication Data

US 2010/0234529 A1 Sep. 16, 2010

(30) Foreign Application Priority Data

Mar. 12, 2009 (EP) ..................................... 09305230

(51) Int. Cl.
*C08G 77/388* (2006.01)
(52) U.S. Cl. .............. 525/100; 528/25; 528/28; 528/29; 528/395; 526/319; 526/321; 526/323.1; 526/323.2; 525/903
(58) Field of Classification Search .................. None
See application file for complete search history.

(56) References Cited

U.S. PATENT DOCUMENTS

| | | | | |
|---|---|---|---|---|
| 4,731,264 | A | 3/1988 | Lin et al. ...................... | 427/387 |
| 5,231,156 | A | 7/1993 | Lin ............................... | 526/279 |
| 5,254,638 | A | 10/1993 | Novak et al. .................. | 525/389 |
| 5,440,011 | A * | 8/1995 | Laine ............................ | 528/425 |
| 2004/0034203 | A1* | 2/2004 | Brook et al. .................. | 530/402 |

FOREIGN PATENT DOCUMENTS

WO WO2008/140491 11/2008

OTHER PUBLICATIONS

Hay J., et al., "Synthesis of Organic-Inorganic Hybrids Via the Non-hydrolytic Sol-Gel Process", Chem. Mater. 2001, vol. 13, 3396-3403.
Doeuff S., et al., "Sol-gel synthesis and characterization of titanium oxo-acetate polymers", Mater. Res. Bull. 1990, 25, 1519—(Abstract Only).
Touati F., et al., "Synthesis of New Hybrid Organic-inorganic Alumina Gels by the Sol-Gel Method", J. Sol-Gel Sci. Technol. 1997, 8, 595-598.
Brandhuber D., et al., "Glycol-Modified Silanes in the Synthesis of Mesoscopically Organized Silica Monoliths with Hierarchical Porosity", Chem. Mater. 2005, 17, 4262-4271.
Goutille Y., et al., "Crosslinking in the melt of EVA using tetrafunctional silane: gel time from capillary rheometry", Polymer, 200344, 3165-3171.
Tangwiwat S., et al., "Barium titanate sols prepared by a diol-based sol-gel route", J. Non-Cryst. Solids, 2005, 351, 976-980.
Eo Young-Joo, et al., "Optical characteristics of photo-curable methacryl-oligosiloxane nano hybrid thick films", J. Mater. Res., 2005, vol. 20 (2), 401-408.
Kang Eun-Seok, et al., "Synthesis and characteristics of curable siloxane-based organic-inorganic hybrid materials modified with vinyl and isopropenoxy", J. Mater. Res., 2006, 21 (5), 1286-1293.
Matsui H., et al., "Synthesis and electronic behaviors of alternating indium-organic moiety binary hybrid copolymer", J. Mater. Sci., 2006, 41, 2137-2139.
Tu Yeur-Luen, et al., "Synthesis and Electrical Characterization of Thin Films of PT and PZT Made from a Diol-Based Sol-Gel Route", J. Am. Ceram. Soc., 1996, 79 (2), 441-448.
Fornasieri G. et al., "Reactivity of Titanium Oxo Ethoxo Cluster [$Ti_{16}O_{16}(OEt)_{32}$]. Versatile Precursor of Nanobuilding Block-Based Hybrid Materials", J. Am. Chem. Soc., 2005, 127, 4869-4878.
Trabelsi S. et al., "Novel organo-functional titanium-oxo-cluster-based hybrid materials with enhanced thermomechanical and thermal properties", Macromolecules, 2005, 38, 6068-6078 (Abstract Only).
Grader G.S., et al., "Modification of Non-Hydrolytic Sol-Gel Derived Alumina by solvent Treatments", J. Sol-Gel Sci. Technol., 2001, 21, 157-164.
Novak B. M., "Hybrid Nanocomposite Materials—Between Inorganic Glasses and Organic Polymers", Advan. Mater., 1993, 5(6), 423-433.
G. Zhang, et al., "Isocyanate-crosslinked silica aerogel monoliths: preparation and characterization", 2004, 350, 152-164.
A. Nebioglu, et al., "Dual-Curable Unsaturated Polyester Inorganic/Organic Hybrid Films", 2006, vol. 99, 115-126.
P. Fabbri, et al., Improvement of the Surface Properties of Polycarbonate by Organic-Inorganic Hybrid Coatings:, 2008, vol. 108, 1426-1436.

* cited by examiner

*Primary Examiner* — Marc Zimmer
(74) *Attorney, Agent, or Firm* — John L. Haack

(57) ABSTRACT

A composite including interpenetrating networks of an organic polymer, such as from an acrylate or olefin, having urethane groups; and an inorganic polymer, the composite having a low or no-shrinkage characteristic, and a method for making the composite, as defined herein.

13 Claims, 2 Drawing Sheets

COMPOSITES AND METHODS OF MAKING AND USING THE COMPOSITES

CLAIMING BENEFIT OF PRIOR FILED APPLICATION

Figure 1:
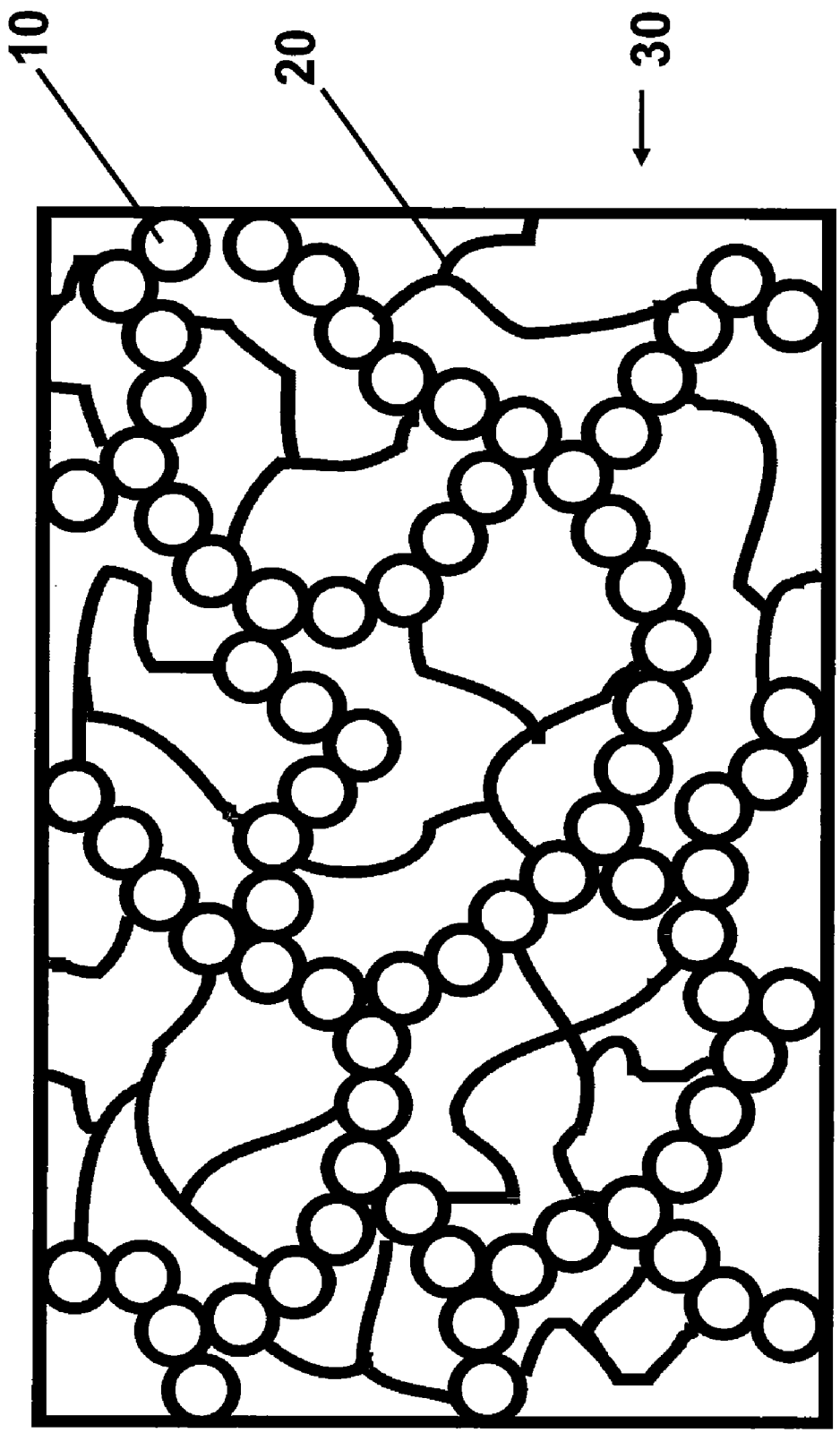

This application claims the benefit of EP Application Serial No. 09 305 230.6, filed on Mar. 12, 2009. The content of this document and the entire disclosure of publications, patents, and patent documents mentioned herein is incorporated by reference.

BACKGROUND

The disclosure relates generally to non-shrinking composites comprising organic and inorganic polymers, and methods of making and using the composites.

SUMMARY

The disclosure provides a nanocomposite material comprised of interpenetrating organic and inorganic polymer networks having, for example, a very low or no-shrinkage characteristic and to methods for making and using the nanocomposite.

BRIEF DESCRIPTION OF THE DRAWING(S)

FIG. 1 schematically shows a nanocomposite comprised of a sol-gel inorganic polymer network, and a cross-linked interpenetrating organic polymer network, in embodiments of the disclosure.

Figure 2:
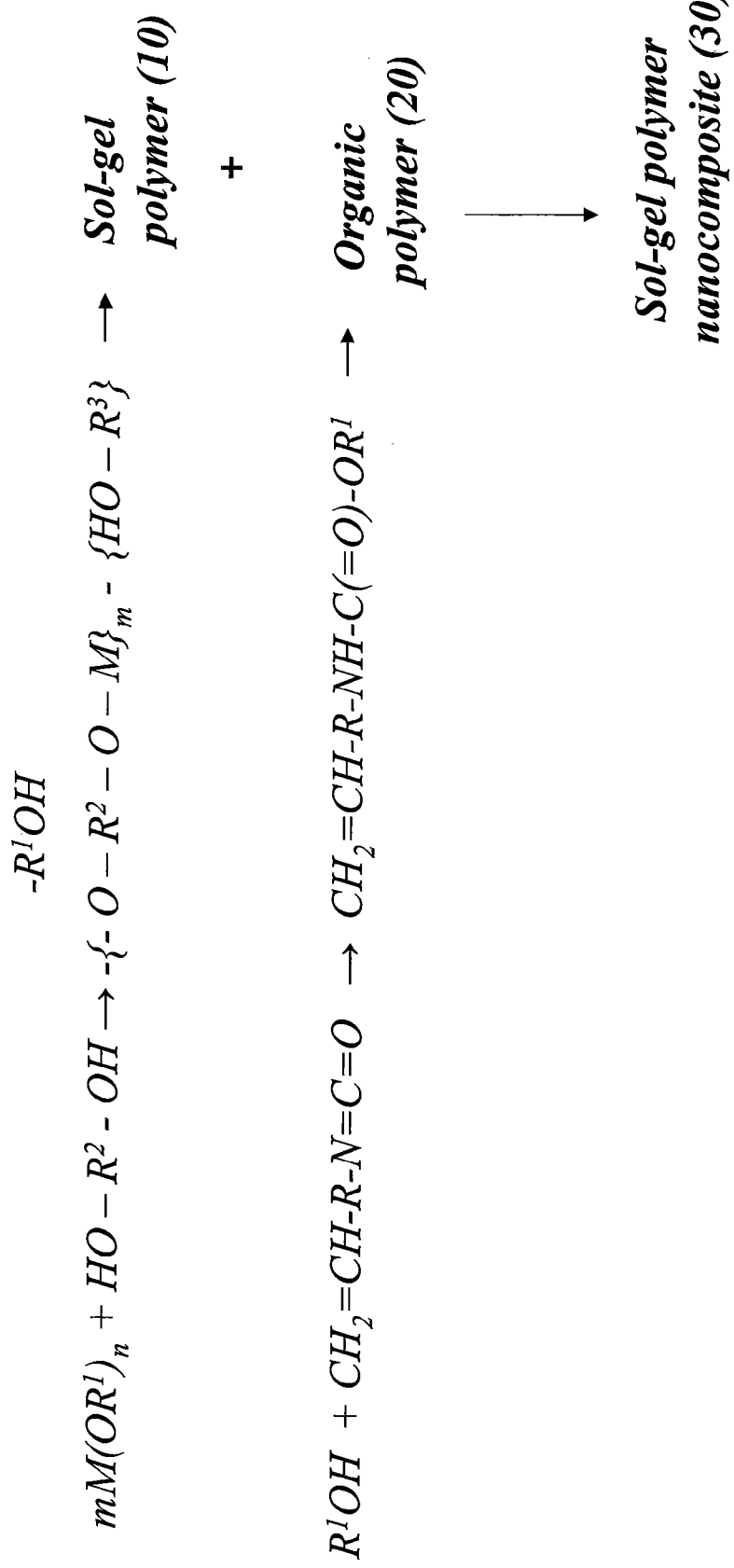

FIG. 2 shows a schematic of the chemical reactions leading to a nanocomposite comprised of a sol-gel inorganic polymer network, and an interpenetrating organic polymer network, optionally having cross-linking, of FIG. 1, in embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"AED" refers to Analysis of Energy Dispersion.
"d" refers to density.
"TGA" refers to Thermo Gravimetric Analysis.
"TMA" refers to Thermal Mechanical Analysis.
"DTA" refers to Dynamic Thermal Analysis.
"CTE" refers to coefficient of thermal expansion.
"SEM" refers to Scanning Electronic Microscopy.
"Sol-gel polymer composite" refers to a nanocomposite material comprised of interpenetrating organic and inorganic polymer networks and prepared in accordance with the disclosure.

"Metal oxide," "metal oxide source," and like terms refer to any starting material or any intermediate product that can lead to the inorganic matrix and is further capable of bonding with the polymeric organic portion of the composite composition.

"Hydrocarbon," "hydrocarbyl," "hydrocarbylene," "hydrocarbyloxy," and like terms refer to monovalent such as —$R^1$ or $R^3$, or divalent —$R^2$— moieties, and can include, for example, alkyl hydrocarbons, aromatic or aryl hydrocarbons, alkyl substituted aryl hydrocarbons, alkoxy substituted aryl hydrocarbons, heteroalkyl hydrocarbons, heteroaromatic or heteroaryl hydrocarbons, alkyl substituted heteroaryl hydrocarbons, alkoxy substituted heteroaryl hydrocarbons, and like hydrocarbon moieties, and as illustrated herein.

"Oxyhydrocarbylene," "oxyhydrocarbyl," and like terms refer to divalent oxygenated hydrocarbylene moieties of, for example, of the formula —$CHR^4$—$CHR^4$—(O—$CHR^4$—$CHR^4$)$_z$—, where z can be an integer of from 1 to about 10, and $R^4$ can be H, or a branched or unbranched, substituted or unsubstituted ($C_{1-8}$)alkyl. Such oxyhydrocarbylene moieties can be, for example, an oligomeric or polymeric alkylene oxide, such as a polyethylene glycol (PEG), a polypropylene glycol (PPG), or like oxyhydrocarbylenes. Numerous suitable oxyhydrocarbylene compounds are commercially available, such as from Sigma-Aldrich.

"Urethane source," "polymerizable urethane source," and like terms refer to any starting material, such as a free-radical polymerizable monomer having an isocyanate group or like compound, or any intermediate product that can lead to the polymeric organic matrix having urethane groups and is further capable of bonding with at least a portion of the inorganic matrix in the composite composition.

"Alkyl" includes linear alkyls, branched alkyls, and cycloalkyls.

"Substituted alkyl" or "optionally substituted alkyl" refers to an alkyl substituent, which includes linear alkyls, branched alkyls, and cycloalkyls, having from 1 to 4 optional substituents selected from, for example, hydroxyl (—OH), halogen, amino (—$NH_2$), nitro (—$NO_2$), alkyl, acyl (—C(=O)R), alkylsulfonyl (—S(=O)$_2$R) or alkoxy (—OR). For example, an alkoxy substituted alkyl, can be a 2-methoxy substituted ethyl of the formula —$CH_2$—$CH_2$—O—$CH_3$, a 1-dialkylamino substituted ethyl of the formula —$CH_2$($NR_2$)—$CH_3$, and like substituted alkyl substituents.

"Aryl" includes a mono- or divalent-phenyl radical or an ortho-fused bicyclic carbocyclic radical having about nine to twenty ring atoms in which at least one ring is aromatic. Aryl (Ar) can include substituted aryls, such as a phenyl radical having from 1 to 5 substituents, for example, alkyl, alkoxy, halo, and like substituents.

"Het" includes a four-(4), five-(5), six-(6), or seven-(7) membered saturated or unsaturated heterocyclic ring having 1, 2, 3, or 4 heteroatoms selected from the group consisting of oxy, thio, sulfinyl, sulfonyl, and nitrogen, which ring is optionally fused to a benzene ring. Het also includes "heteroaryl," which encompasses a radical attached via a ring carbon of a monocyclic aromatic ring containing five or six ring atoms consisting of carbon and 1, 2, 3, or 4 heteroatoms each selected from the group consisting of non-peroxide oxy, thio, and N(X) wherein X is absent or is H, O, ($C_{1-4}$)alkyl, phenyl, or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

In embodiments, halo or halide includes fluoro, chloro, bromo, or iodo. Alkyl, alkoxy, etc., include both straight and branched groups; but reference to an individual radical such as "propyl" embraces only the straight chain radical, a branched chain isomer such as "isopropyl" being specifically referred to.

The carbon atom content of various hydrocarbon-containing (i.e., hydrocarbyl) moieties can alternatively be indicated by a prefix designating a lower and upper number of carbon atoms in the moiety, i.e., the prefix $C_{i-j}$ indicates a moiety of the integer "i" to the integer T carbon atoms, inclusive. Thus, for example, $(C_1-C_7)$alkyl or $C_{1-7}$alkyl refers to alkyl of one to seven carbon atoms, inclusive, and hydrocarbyloxy such as $(C_1-C_8)$alkoxy or $C_{1-8}$alkoxy refers to alkyl of one to eight carbon atoms, inclusive.

Specifically, $C_{1-7}$alkyl can be methyl, ethyl, propyl, isopropyl, butyl, iso-butyl, sec-butyl, tert-butyl, pentyl, 3-pentyl, hexyl, or heptyl; $(C_{3-12})$cycloalkyl can be cyclopropyl, cyclobutyl, cyclopentyl, cyclohexyl, cycloheptyl, cyclooctyl, bicyclic, tricyclic, or multi-cyclic substituents.

$C_{1-8}$alkoxy can be methoxy, ethoxy, propoxy, isopropoxy, butoxy, iso-butoxy, sec-butoxy, pentoxy, 3-pentoxy, hexyloxy, 1-methylhexyloxy, heptyloxy, octyloxy, and like substituents.

Aryl (Ar) can be phenyl, naphthyl, anthracenyl, phenanthrenyl, fluorenyl, tetrahydronaphthyl, or indanyl. Het can be pyrrolidinyl, piperidinyl, morpholinyl, thiomorpholinyl, or heteroaryl. Heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

A specific value for Het includes a five-(5), six-(6), or seven-(7) membered saturated or unsaturated ring containing 1, 2, 3, or 4 heteroatoms, for example, non-peroxide oxy, thio, sulfinyl, sulfonyl, and nitrogen; as well as a radical of an ortho-fused bicyclic heterocycle of about eight to twelve ring atoms derived therefrom, particularly a benz-derivative or one derived by fusing a propylene, trimethylene, tetramethylene or another monocyclic Het diradical thereto.

Other conditions suitable for formation and modification of the compounds, oligomers, polymers, composites, or like products and articles of the disclosure, from a variety of starting materials or intermediates, as disclosed and illustrated herein are known. For example, see Feiser and Feiser, "Reagents for Organic Synthesis", Vol. 1, et seq., 1967; March, J. "Advanced Organic Chemistry," John Wiley & Sons, 4$^{th}$ ed. 1992; House, H. O., "Modem Synthetic Reactions," 2$^{nd}$ ed., W. A. Benjamin, New York, 1972; and Larock, R. C., "Comprehensive Organic Transformations," 2$^{nd}$ ed., 1999, Wiley-VCH Publishers, New York. The starting materials employed in the preparative methods described herein are, for example, commercially available, have been reported in the scientific literature, or can be prepared from readily available starting materials using procedures known in the field. It may be desirable to optionally use a protecting group during all or portions of the above described or alternative preparative procedures. Such protecting groups and methods for their introduction and removal are known in the art. See Greene, T. W.; Wutz, P. G. M. "Protecting Groups In Organic Synthesis," 2$^{nd}$ ed., 1991, New York, John Wiley & Sons, Inc.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a sol-gel polymer composition, to a method of making or using the hybrid sol-gel polymer composition, or formulation, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, excessive, extended, or unnecessary exposure of the resulting nanocomposite to high heat or high drying temperatures; insufficient heating in the first or second heating resulting in incomplete alcoholysis and polymerization reactions, respectively; and like conditions.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, initiators, promoters, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

The sol-gel process is an established method for glass preparation that doesn't require high temperatures as with a traditional method of forming inorganic oxide glass, such as $SiO_2$ by melting glass forming compounds at high temperatures, for example, more than 1,400° C. With the sol-gel method the condensation of reactive hydrolyzed metal alkoxides can occur in the liquid phase at temperatures, e.g., from about 25 to about 60° C. The established sol-gel process is a two step process where metal alkoxides are first hydrolyzed to form metal hydroxides then the hydroxides condense to form a three-dimensional network (For additional definitions, descriptions, and methods of silica materials and related metal oxide materials, see for example, R. K. Iler, *The Chemistry of Silica*, Wiley-Interscience, 1979).

Inorganic-organic composite materials are increasingly important due to their extraordinary properties which can arise from the synergy between the components. The applications of the disclosed materials are numerous. Different combinations of organic and inorganic polymers permit products having properties which cannot be obtained by traditional composite materials.

A challenging aspect of these hybrid organic-inorganic systems is the control of the mixing between the two dissimilar species, which species determine such important parameters as the homogeneity of the final product. The formation of interpenetrating networks (IPNs) between organic and inorganic polymers is one possible solution to the control problem. The simultaneous synthesis of IPNs can result in a macroscopically homogeneous material.

A major issue encountered during the preparative process arises from the different stabilities of the polymers. While inorganic systems are thermally quite stable and are often formed at high temperature, most organic ingredients have an upper temperature limit of around 250° C. Therefore, the synthesis of hybrid composite systems requires a strategy where the conditions of formation are well-suited to each of the components, e.g., the use of a low-temperature formation procedure. For this reason milder reactions are selected. An ideal procedure for the generation of such composite materials is the sol-gel process. The sol-gel method allows composite materials made of inorganic and organic components which would not survive the very high temperatures of traditional glass making methods.

Unlike well-known methods for glass preparation, the sol-gel process doesn't require high temperatures as traditional methods of forming inorganic oxide glass, such as $SiO_2$, by melting of glass forming compounds at high temperatures (more than 1,400° C.). Using the sol-gel method, the condensation of reactive hydrolyzed metal alkoxides can occur in the liquid phase at about 25° C. to about 60° C. The sol-gel procedure generally involves a two step process where a metal alkoxide is hydrolyzed to form metal hydroxides, and the resulting metal hydroxides condense to form a three-dimensional (3D) network.

Acid or base catalysts (cat.) may be used for the hydrolysis. By varying the catalyst type, amount, or both, significant effects on gelation time, bulk and apparent density, and volume shrinkage on drying are observed (Brinker, et al., *Sol-gel Science*, San Diego, Academic Press, 1990).

However, a sol-gel process involving transalcoholysis (transesterification) of different metal alkoxides (Si, Al, etc.) has been described (Doeuff, et al., *Mater. Res. Bull.*, Vol. 25, pg. 1519, 1990; Touati, et al., *J. Sol-Gel Sci. Technol.*, Vol. 8, pg. 595, 1997; Brandhuber, et al., *Chem. Mater.*, Vol. 17, pg. 4262, 2005; Goutille, et al., *Polymer*, Vol. 44, pg. 3165, 2003; Tangwiwat. et al., *J. Non-Cryst. Solids*, Vol. 351, pg. 976, 2005; Eo, et al., *J. Mater. Res.*, Vol. 20 No. 2, pg. 401, 2005; Kang, et al., *J. Mater. Res.*, Vol. 21 No. 5, pg. 1286, 2006; Matsui, et al., *J. Mater. Sci.*, Vol. 41, pg. 2137, 2006; Tu, et al., *J. Am. Ceram. Soc.*, Vol. 79, No. 2, pg. 441, 1996; Formasieri, et al., *J. Am. Chem. Soc.*, Vol. 127, pg. 4869, 2005; Trabelsi, et al., *Macromolecules*, Vol. 38, pg. 6068, 2005; Tu, et al., *J. Mater. Res.*, Vol. 11, No. 10, pg. 2556, 1996). The reaction of metal alkoxides with a variety of glycols or alcohols at room temperature produces a gel over times of a few minutes to a few days.

Alcoholysis with ethylene glycol and propane-1,2-diol has been studied by IR and NMR spectroscopy (see Doeuff; Touati; Brandhuber; and Tangwiwat supra). In particular, it was shown that an interchange reaction between alkoxyl groups of metal alkoxides and diols groups occurs, leading to the hybrid gels. A simplified reaction scheme is:

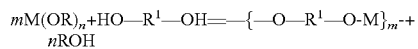

where ROH is liquid by-product, M is a metal, R and $R^1$ are, for example, alkyl, m is arbitrary, and n can be 1 to 6.

Procedures have been reported for preparation of metal oxides from metal alkoxides without using water. One of those procedures is represented by the so-called "nonhydrolytic sol-gel process", which involves the reaction of metal alkoxides and metal halides (Grader, et al., *J. Sol-Gel Sci. Technol.*, Vol. 21, pg. 157, 2001).

Notwithstanding all the unique positives of sol-gel processes, a disadvantage is encountered in making monolithic hybrid composites. Once formed, the gelled $SiO_2$ network must be dried, requiring the removal of cosolvent(s) and liberated alcohol, and water, if present. This requisite drying process effectively prevents the practical and reproducible synthesis of monoliths or thick films having dimensions greater than a few millimeters because larger objects tend to shrink, crack, or shatter. Cracking can be minimized by, for example, very slow, controlled drying over weeks or months, by increasing the average pore size through the introduction of colloidal silica seed particles, by adding surfactants, by supercritical drying, or by the addition of special reagents. One of the major obstacles to the widespread application of sol-gel techniques is that the drying process is accompanied by extraordinary shrinkage of the solid inorganic phase. Related to the volume fraction of volatiles removed, shrinkage can routinely be on the order of about 50 to 70% by weight (Novak, et al., *Mater. Sci. and Eng.*, Vol. A162, pg. 257, 1993). Shrinkage of this magnitude precludes many molding applications and can introduce a high degree of stress in sol-gel monolithic composites. The yield of the resulting solid product of the sol-gel process is limited to about 20 to about 30 weight %. Even in the solvolysis of metal alkoxides with pure organic acids, without water and cosolvent(s), there are liquid by-products (i.e., acid esters and water as the polycondensation by-product). So, shrinkage appears to be an issue in sol-gel techniques even in a transesterification reaction where an alcohol has to be removed from the final solid product.

Minimizing the inorganic matrix shrinkage can be particularly important in the fabrication of composites using sol-gel processes as the shrinking tends to induce a high degree of stress within the material, particularly if the organic polymer is below its glass transition temperature.

Novak has proposed a series of tetra-alkoxysilane derivatives possessing polymerizable (unsaturated) alkoxide groups in place of ethoxide or methoxide groups (Novak, *Advan. Mater.*, Vol. 5, No. 6, pg. 423, 1993). The hydrolysis and condensation of these siloxane derivatives liberate a polymerizable alcohol. In the presence of the appropriate catalyst (free radical or ROMP), and by using a stoichiometric amount of water and the corresponding alcohol as cosolvent, all components of these derivatives are polymerized. Since both the cosolvent and the liberated alcohol polymerize, the gel drying process is much shorter and the product shrinkage is minimized. The disadvantages of Novak's method are, for example: the need to synthesize the non-commercial metal alkoxides containing the polymerizable groups, and incomplete avoidance of the shrinkage effect as the by-product of polycondensation process (i.e., water) has to be removed by drying the final solid product.

It is known that primary alcohols may react with reagents containing isocyanate groups at an ambient temperature even without any catalyst to form urethanes (Roberts, et al., "Basic principles of organic chemistry," W. A. Benjamin, Inc., NY, Von, 1964).

The reagents containing isocyanate groups have been widely used in the sol-gel technique (Zhang, et al., *J. Non-Cryst. Solids*, Vol. 350, pg. 152, 2004; Grandfy, et al., *J. Non-Cryst. Solids*, Vol. 352, pg. 273, 2006; Liu, et al., *Eur. Polymer. J.*, Vol. 44, pg. 940, 2008; Nebioglu, et al., *J. Appl. Polymer Sci.*, Vol. 99, pg. 115, 2006; Daimatsu, et al., *J. Appl. Polymer Sci.*, Vol. 108, No. 1, pg. 362, 2008; Fabbri, et al., *J. Appl. Polymer Sci.*, Vol. 108, No. 3, pg. 1426, 2008). Reagents having isocyanate functionality can be used in crosslinking silica particles for the reinforcement of a silica aerogel network (Zhang supra) or for preparing transparent homogeneous polymers having silicone macrounits in the polymer chains (Grandfy; and Liu supra).

Organofunctional silanes like isocyanatopropyltriethoxysilane (ICPES), have been used as coupling binders, including many polymers (Nebioglu, et al., *J. Appl. Polymer Sci.*, Vol. 99, pg. 115, 2006). Such silanes are usually used following hydrolysis of alkoxy groups and provide chemical compatibility with the organic portion of organic-inorganic hybrid materials.

Organic monomers containing isocyanate functional groups, such as 2-isocyanatoethyl methacrylate, are known (Daimatsu, et al., *J. Appl. Polymer Sci.*, Vol. 108, No. 1, pg. 362, 2008). The reaction of these monomers with alcohols proceeds cleanly without catalysis and without a by-product:

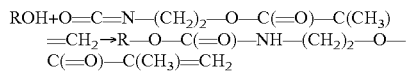

The desired product is a free-radical polymerizable acrylate monomer having urethane group or side chain which monomer can participate in polymerization (solidification) processes.

Isocyanate groups are very reactive and can interact with surface-terminated —Si—OH groups on the silica particles (Zhang; Grandfy; Liu; Nebioglu; and Daimatsu supra; and Fabbri, et al., *J. Appl. Polymer Sci.*, Vol. 108, No. 3, pg. 1426, 2008):

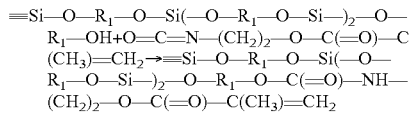

The use of monomers containing isocyanate groups can provide the chemical coupling between organic polymers and an inorganic moiety (i.e., the product of sol-gel process) which typically provides some residual —Si—OH groups.

Consequently, the use monomers, oligomers, or polymers containing isocyanate groups can provide homogeneous transparent materials even when sol-gel precursors not having any polymerizable organic groups, such as tetraethoxy/methoxysilane (TEOS/TMOS) or titanium isopropoxide (TIPO).

In embodiments, the disclosure provides non-shrinking composite materials and articles comprising chemically linked organic and inorganic polymers.

In embodiments, the disclosure provides a sol-gel method for a one-pot synthesis to form, for example, non-shrinkable organic-inorganic nanocomposite materials having a high solid product yield (e.g., >90 wt %). Organic-inorganic nanocomposite materials, and method for its production are provided where a metal (M) alkoxide is alcoholyzed in a mixture of glycols, polydiols, or alcohols, and subsequent reaction with polymerizable monomers, polymerizable oligomers, or both, having at least one isocyanate group to form a gel with simultaneous interaction of the sol-gel process by-product (e.g., primary alcohols) with the reactant containing the at least one isocyanate group and subsequent polymerization of that product.

In embodiments, the disclosure provides organic-inorganic nanocomposite materials and solid articles thereof having a network of inorganic and organic polymer chains.

In embodiments, the disclosure provides a composite comprising: interpenetrating networks comprised of:
an inorganic network comprised of a source of metal oxide, and a source of a diol, an alcohol, or a combination of a diol and an alcohol; and
an organic network comprised of a source of a polymer having urethane pendant groups, and a polymer cross-linker.

In embodiments, the disclosure provides a composite prepared by any of the preparative processes disclosed herein.

In embodiments, the disclosure provides a method for making a non-shrinking material having an organic co-polymer(s) embedded in an inorganic matrix where both phases are covalently bonded to each other.

The starting reactants can be selected so that the resulting product does not shrink during the entire process including the drying procedure with the exception of minor shrinkage (less than about 10% by volume) due to the contraction of the polymeric phase volume during the liquid organic monomer polymerization.

In embodiments, the disclosure provides a method that includes: forming a solution or mixture of the following reactants:
a metal alkoxide(s) of the formula $R_x$-$M(OR')_{4-x}$, wherein M is Si, Ti, Al, or Zr, or like metals and combinations thereof, R, if present, is an organic radical, OR' is a hydrolyzable low molecular weight alkoxy group, and x is from 1 to 4, such as tetramethoxysilane (TMOS), tetraethoxysilane (TEOS),3-(trimethoxysilyl)propyl methacrylate (TMSPM), titanium ethoxide (TEO), titanium isopropoxide (TIPO), aluminum triethoxide (ATO), aluminum isopropoxide (AIPO), zirconium ethoxide (ZEO), and like metal oxides, or combinations thereof;
a glycol, an alcohol, or a mixture thereof, which can be, for example, ethylene glycol, propane-1,2-diol, or 2-hydroxyethyl methacrylate/acrylate, polydiols such as polyethylene glycol (PEG) or propylene glycol (PPG) (the mole ratios of the metal alkoxide and the glycol or alcohol component can be, for example, from about 1:1 to about 1:2, which is sufficient for the complete expenditure of all alcohol molecules in an alcoholysis reaction of the metal alkoxide);
a monomer or an oligomer containing at least one isocyanate group, such as 2-isocyanatoethyl methacrylate (ICEM), 3-isopropenyl-α,α-dimethylbenzyl isocyanate (IPBIC), or an —NCO bearing aliphatic/aromatic urethane acrylate (Bayer Co.), (the mole ratios of the metal alkoxide with respect to the monomer or oligomer component can be, for example, from about 1:1 to about 1:2.5, which is sufficient for the complete expenditure of all alcohol molecules in the alcoholysis reaction of the metal alkoxide);
a cross-linking agent, such as (ethylene glycol)$_n$ dimethacrylate/diacrylate or divinyl esters where n ranges from about 1 to about 4, trimethylolpropane ethoxylate (e.g., 1 EO/OH, 7/3 EO/OH etc.), bisphenol A ethoxylate (e.g., 2 EO/phenol) diacrylate or dimethacrylate, divinyl benzene and like agents, or combinations thereof (the mole percentages of the cross-linking agent relative to the unsaturated monomers can be, for example, from about 1% to about 10%); and
a free-radical polymerization initiator, such as azo-compounds (e.g., azobisisobutyronitrile), or organic peroxides (e.g., benzoyl peroxide, dicumyl peroxyde) (content of the initiator can be, for example, from about 0.1 to about 4.5% by weight relative to the monomers).

In embodiments, the mixture can be prepared in two steps. First, metal alkoxide and glycol or alcohol, are mixed with heating to give a transparent homogeneous solution. Then, the other above listed components can be added, and the mixture heated until the alcoholysis reaction and the polymerization process are complete. The resulting nanocomposite materials do not contain any liquid by-products and do not shrink.

In embodiments, the disclosure provides advantages including providing, for example:

a low cost composite material from low cost commercially available starting materials;

a process having low energy cost because of lower reaction temperatures in the product formation reaction, and avoiding long-term drying for alcohol removal;

a catalyst-free process;

a highly homogeneous composite material having inorganic moieties free of polymerizable groups can be obtained;

high yields, e.g., greater than about 90 wt %, of the final solid product can be obtained;

a final solid product that is free of cracking defects;

a final consolidated monolithic substrate product that is free of dimensional or shape limits due to the absence of liquid by-product; and the preparative process leading to the product composite can be varied over a wide range of structure, composition, or both, based on different combinations of the metal alkoxide and the organic moieties selected.

In embodiments, the disclosure provides processes that can use a metal alkoxide such as $Si(OEt)_4$ (i.e., TEOS), or $Ti(OR)_4$ where R is alkyl, or like metal alkoxide, which do not have or exclude a free-radical polymerizable R group. In embodiments, the disclosure can provide substantially or completely transparent final products. Such transparent products can be obtained, for example, when TEOS, or like metal alkoxides are selected as the inorganic oxide source or precursor component, and where the metal alkoxide does not have an organic polymerizable group in the metal alkoxide.

In embodiments, the disclosure provides processes that can use a metal alkoxide of the formula $R-M(OR^1)_3$ such as $R—Si(OR^1)_3$ or $R—Ti (OR^1)_3$, where R, $R^1$, or both, can be a free-radical polymerizable moiety. In embodiments, the disclosure provides processes that can use a metal alkoxide of the formula $R-M(OR^1)_3$ where R, $R^1$, or both, exclude a free-radical polymerizable group.

Although not limited by theory, the highly homogeneous, transparent products may be attributed to the very high reactivity of isocyanate groups with respect to —OH groups. Thus, for example, when TEOS reacts with a diol, there results a first formed product having a residual —OH. The isocyanate groups can react with these residual —OH groups to provide a chemical bond that links the isocyanate and the metal oxide-diol reaction product. The use of isocyanate groups provides an option to preparing composite products of the present disclosure which are free of certain polar groups such as carboxylic acids, which products are more hydrophobic compared to the sol-gel polymer composites disclosed in commonly owned, copending patent application, European National Application No. 08305847.9, filed Nov. 26, 2008.

In embodiments of the disclosure, the problems of drying and shrinkage-effect in sol-gel preparative processes can be solved by selecting reactants which do not require added solvent and which reactants produce intermediate products which can consume or incorporate any liquid by-products into the final product.

We have surprisingly discovered that a highly efficient process for preparing low- or non-shrinking sol-gel-polymer nanocomposites.

In embodiments, the disclosure provides compositions and methods for making low shrinkage or completely non-shrinking material comprised of an inorganic metal oxide matrix having an interpenetrating network of an organic polymer. In embodiments, the disclosure provides a one-pot sol-gel method for forming a sol-gel polymer material comprising a non-shrinkable organic-inorganic nanocomposite material having high solid product yields, e.g., greater than about 90%. Starting materials, intermediates, organic-inorganic nanocomposite products, and method for making the nanocomposite are disclosed. The method of making the nanocomposite generally involves the following. A metal alkoxide is alcoholyzed in a mixture of a glycol (diol), an alcohol, or both, to form a transparent solution. Next, an unsaturated isocyanate (i.e., a urethane source) is added to the mixture to form a polymer having isocyanate groups which can further react to form urethane products. The resulting organic-inorganic nanocomposite material comprises a network of inorganic oxides having inter-penetrating chains of the in situ polymerized monomer, such as an acrylate polymer formed for unsaturated isocyanate compounds.

The starting reactants can include, for example, a metal (M) alkoxide, where M is, e.g., Si, Al, Ti, Zn, and like metals, or mixtures thereof, and a glycol, such as ethylene glycol, propane-1,2-diol, and like glycols or polyglycols (such as polyethylene glycol, polypropylene glycol, and like polyglycols), and an unsaturated isocyanate, such as a methacrylic acid ester having an isocyanate group, a cross-linking agent, such as an di-acrylic, di-methacrylic, or like esters of mono-diethylene glycol, or divinylbenzene, and a free radical polymerization initiator or agent, such as AIBN, benzoyl peroxide, dicumyl peroxide, and like initiators, or actinic radiation.

The alcoholysis or glycolysis, of metal alkoxides provides metal hydroxides, which are the precursors of an inorganic network. The alcohol by-product of the metal alkoxide alcoholysis or glycolysis, can react with the unsaturated isocyanate forming an unsaturated urethane, which unsaturated urethane polymerizes and cross-links in the presence of a cross-linking agent. The cross-linking agent can be present in an amount of, for example, from about 0.001 to about 5 weight % based on the weight of the added unsaturated isocyanate.

The simultaneous operation of two reaction processes, i.e., a sol-gel formation by an alcoholysis manifold, and a free-radical polymerization manifold, having alcoholysis by-product participation and conversion into the organic polymer manifold, provides a solid inorganic network which is intimately interwoven on a molecular level with a cross-linked interpenetrating network of polymer chains.

The product can be formed as a consolidated monolithic substrate without dimensional or form limitations due to the absence of any substantial liquid by-product.

The structure and composition of nanocomposite material can be readily varied within a broad range because many different metal alkoxides and many different organic monomers can be selected for use in the process.

In embodiments, the disclosure provides a solvent-less method of making an organic-inorganic nanocomposite comprising, for example:

reacting a mixture comprised of a metal alkoxide of the formula $R_x-M(OR^1)_{4-x}$, or of the formula $R_x-M(OR^1)_{m-x}$, as defined herein, and a diol of the formula $HO—R^2—OH$, to form an intermediate reaction product comprised of an inorganic metal oxide matrix and a liquid alcohol by-product; and adding a polymerizable urethane source, such as a free-radical polymerizable monomer having an isocyanate group or an oligomer thereof, to the resulting reaction mixture to take-up the alcohol by-product and form a monomer or oligomer having a urethane group, the resulting monomeric or oligomeric urethane polymerizes in free-radical fashion to a polymer having urethane groups, which polymer in combination with the metal oxide sol-gel matrix forms an end product comprised of a nanocomposite having interpenetrating networks of the inorganic and organic components.

Consumption of the alcohol generated in the formation of the metal oxide matrix comprises reacting the initially added alcohol or glycol, or liberated alkoxide with, for example, a urethane forming component, such as the unsaturated isocyanate.

The inorganic metal oxide matrix formed by the reaction of the metal alkoxide of the formula $R_x$-M(OR$^1$)$_{m-x}$, and the diol of the formula HO—R$^2$—OH, as defined herein, comprises alcoholysing with the diol (i.e., glycolyzing,) the metal alkoxide to form an inorganic oxide matrix of the formula:

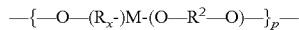

where M is a metal, and p is a number of repeat units of at least, for example, about 2 or more. In embodiments, the number of repeat units p can be, for example, several hundred to several thousand or more. In embodiments, the metal alkoxide of the formula $R_x$-M(OR$^1$)$_{m-x}$, can be, for example, 3-(trimethoxysilylpropyl)methacrylate (TMSPM) where $R_x$ is propyl methacrylate and OR$^1$ is methoxy.

The inorganic metal oxide matrix resulting from the reaction mixture of the metal alkoxide and the alcohol of the formula HO—R$^3$ comprises accomplishing alcoholysis of the metal alkoxide to form the inorganic oxide matrix of the formula:

—O-{M-(O—R$^3$)$_2$O—}$_q$— where M is a metal and q can be from 2 to about 5,000.

In embodiments, the disclosure provides a method for making a composite comprising:

a first heating, such as with mild heating, a first mixture comprising:

i.) a metal alkoxide of the formula $R_x$-M(OR$^1$)$_{m-x}$,
where M is Si, Ti, Ta, Sn, Al, Zr, Hf, or a combination thereof,
R, if present, is a hydrocarbyl group having from 1 to about 10 carbon atoms, for example, alkyl, -alkoxy, -acryl, -methacryl, -alkenyl, -cycloalkyl, -heterocyclic, -aryl, -heteroaryl, -alkylene-cycloalkyl, -cycloalkylene-alkyl, -alkylene-aryl, -alkylene-heteroaryl, -arylene-alkyl, -heteroarylen-alkyl, -alkylene-acryl, -alkylene-methacryl, or mixtures thereof,
OR$^1$ is each independently an alcoholyzable hydrocarbyloxy group, also known as an alkoxy group, having from 1 to about 10 carbon atoms,
x is 0 to 5, and
m is 1 to 5; and
ii.) a diol of the formula HO—R$^2$—OH, or an alcohol of the formula HO—R$^3$,
where
R$^2$ is a divalent substituted or unsubstituted hydrocarbylene group, also known as an alkyl group, having from 1 to about 10 carbon atoms, or an oligomeric or polymeric group comprising, for example, at least one chain incorporating a plurality of alkoxyl groups, for example, polyethers such as a polyalkylene glycol, urethane groups, carbonate groups, or a combination thereof; and
R$^3$ is a hydrocarbylene group having from 3 to about 18 carbon atoms; or
iii.) a mixture of a diol of the formula HO—R$^2$—OH and an alcohol of the formula HO—R$^3$; and
combining a monomer having at least one isocyanate or a polymerizable oligomer having at least one isocyanate, a cross-linker, and a free radical initiator with the resulting heated first mixture, and accomplishing a second heating to form the composite.

The first heating can be accomplished, for example, with heating at from about 50 to about 150 degrees C., for about 0.5 to about 5 hours.

The second heating can be accomplished, for example, with heating at an increasing temperature, such as in a gradient or in one or more steps, of from about 45 to about 150 degrees C., over a period of for about 20 to about 100 hours.

The metal alkoxide can comprise at least one of 3-(trialkoxysilylpropyl)methacrylate, 3-(trialkoxysilylpropyl)acrylate, trialkoxyvinylsilane, styrylethyltrialkoxysilane, tetraalkoxysilane, titanium alkoxide, aluminum trialkoxide, tin tert-alkoxide, hafnium alkoxide, tantalum alkoxide, zirconium alkoxide, or a combination thereof, for example, 3-(trimethoxysilylpropyl)methacrylate (TMSPM), tetraethoxysilane (TEOS), triethoxyvinylsilane (TEVS), styrylethyltrimethoxysilane (SEMS), tetramethoxysilane (TMOS), titanium ethoxide (TEO), titanium isopropoxide (TIP), aluminum triethoxide (ATO), aluminum tributoxide (ATB), tin tert-butoxide (TTB), hafnium butoxide (HAB), tantalum ethoxide (TAE), aluminum isopropoxide (AlPO), zirconium ethoxide (ZEO), zirconium propoxide (ZIP), and like metal alkoxides, or a combination thereof.

The diol can comprise, for example, at least one of an alkylene glycol, a propylene glycol, a poly(alkylene glycol), a polyurethane diol, a polycarbonate, a bisphenol, an alkoxylated bisphenol diol, or a combination thereof, such as ethylene glycol, 1,2-propylene glycol, a polyethylene glycol, a polypropylene glycol), a bisphenol, an alkoxylated phenol such as an ethoxylated phenol, a polycarbonate, an alkoxylated bisphenol diol, a polyurethane diol, a polycarbonate diol, and like diol compounds, or a combination thereof.

The alcohol can be, for example, at least one free radical reactive hydroxy containing acrylate monomer such as 2-hydroxyethyl acrylate (HEA), 2-hydroxyethyl methacrylate (HEMA), or a combination thereof.

The monomer having at least one isocyanate or a polymerizable oligomer having at least one isocyanate can be, for example, an unsaturated isocyanate monomer, having at least one isocyanate or an oligomeric unsaturated isocyanate monomer having at least one isocyanate, such as at least one of an aliphatic isocyanate containing an acrylate, an aromatic isocyanate containing an acrylate, and like polymerizable isocyanates, or a combination thereof. The unsaturated isocyanate, that is, a polymerizable monomer having isocyanate groups can be, for example, an isocyanate having at least one unsaturation comprising a carbon-carbon double bond and at least one —NCO group. The at least one unsaturation can be, for example, an unsaturated acid ester such as an acrylic acid ester, an alkyl acrylic acid ester such as methacrylic acid ester, crotonic acid ester (3-methylacrylic acid ester), itaconic acid ester (2-methylidenebutanedioic acid ester), an alkenyl or hydrocarbylenyl of the partial formula CR$^4_2$=CR$^4$— where R$^4$ can be, for example, H, or (C$_{1-8}$)alkyl, and like hydrocarbylenes, unsaturated acid esters, acid esters, cyclic unsaturated acid esters, or a combination thereof. The at least one isocyanate (—NCO) group can be attached to the unsaturated acid ester at any suitable position which can accomplish the preparative process and provide the desired product. Examples of suitable unsaturated isocyanate compounds capable of producing a polymer product and subsequently having a urethane moiety are listed below by name and formula.

2-isocyanatoethyl methacrylate (ICEM) of the formula:

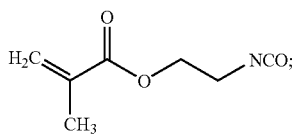

3-isopropenyl-α,α-dimethylbenzyl isocyanate (IPBIC) of the formula:

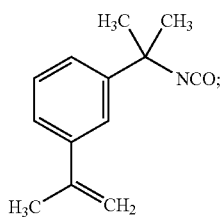

an oligo-urethane acrylate source having isocyanate groups (e.g., Desmolux® VP LS; Bayer Corp.) of the formula:

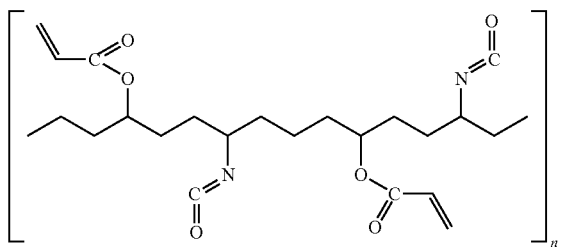

The unsaturated isocyanate compounds, that is, a polymerizable urethane source, can include monomeric or oligomeric isocyanate compounds, for example, olefinically such as ethylenically, vinylically, and like free radical polymerizable groups or combinations thereof, such as alpha,beta-unsaturated ketones, alpha,beta-unsaturated esters, and like free radical polymerizable groups or combinations thereof, that further include an isocyanate group. The isocyanate group is capable of further reaction within the incipient composite matrix to produce a urethane linkage in the final product composite.

In embodiments, the mole ratio of the metal alkoxide and the unsaturated isocyanate or polymerizable isocyanate component or its corresponding polymerized component can be, for example, from about 1:1 to about 1:2, which is enough for the complete consumption of all alcohol molecules generated in the alcoholysis or glycolysis reaction of the metal alkoxide.

The cross-linker or cross-linking agent can be, for example, at least one of a dialkylene glycol diacrylate, a dialkylene glycol dimethacrylate, a trimethylolpropane alkoxylate triacrylate, a divinylaryl, and like cross-linkers, or a combination thereof, such as a dialkylene glycol diacrylate such as (ethylene glycol)$_n$-dimethacrylate or -diacrylate, or a divinyl ester, where n is from 1 to 4, a trimethylolpropane ethoxylate triacrylate (available from Sigma-Aldrich) (having e.g., 1:1 EO:OH, 7:3 EO:OH, and like equivalent levels of ethoxylation), bisphenol A ethoxylate (e.g., 2 EO per phenol) diacrylate or dimethacrylate, and divinyl benzene. Preferred molar equivalent percentages of the cross-linking reagent relative to the content of the unsaturated monomer can be from about 0.1% to about 10%. In embodiments, a preferred cross-linker family can be, for example, trimethylolpropane ethoxylate triacrylate cross-linkers, of the formula:

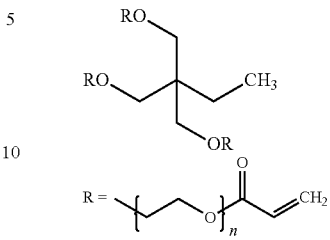

available from Sigma-Aldrich, for example, trimethylolpropane ethoxylate (14:3=EO:OH) triacrylate, trimethylolpropane ethoxylate (7:3=EO:OH) triacrylate having an average $M_n$ of about 912, and like cross-linkers, or a combination thereof.

The free-radical initiator can be, for example, at least one of a thermo-polymerization initiator, a photo-polymerization initiator, or a combination thereof, such as an azo-compound (e.g.: azobisisobutyronitrile, AIBN), organic peroxides (e.g., benzoyl peroxide, dicumyl peroxide) and like initiators. Preferred amounts of the initiator can be, for example, from about 0.1 to about 0.5% by weight relative to the monomer, or sufficient actinic radiation, or combinations thereof, and like polymerization initiators.

The first heating and second heating can be accomplished, for example, free of any added solvent or diluent. In embodiments, the method can be accomplished in a single vessel, that is, a single-pot.

With regard to controllably forming products having, for example, desired optical properties, if tetraethoxysilane (TEOS) is selected as the metal alkoxide in combination with a glycol or if tetraethoxysilane (TEOS) is selected as the metal alkoxide in combination with hydroxyethyl methacrylate (HEMA), hydroxyethyl acrylate (HEA), or both acrylates, then a non-transparent or translucent monolithic product can be obtained. Additionally, with regard to forming products having desired optical properties, if trimethoxysilyl propylmethacrylate is selected as the metal alkoxide in combination with a glycol or in combination with hydroxyethyl methacrylate (HEMA), hydroxyethyl acrylate (HEA), or both acrylates, then a transparent monolithic product is obtained.

In embodiment, the resulting organic-inorganic nanocomposite can be, for example, a non-meltable, homogeneous solid. Many of the nanocomposites of the disclosure may have decomposition points at or near their melting points. In embodiments, the yield of the resulting organic-inorganic nanocomposite can be, for example, from about 90% to about 98 wt %, or greater.

In embodiments, the second heating, such as with mild heating, can be accomplished, for example, until the solid product has a constant weight, i.e., free of any significant weight change. The second heating provides a homogeneous solid monolith composite free of shrinking, cracking, or a combination thereof.

The reaction mixture can have a volume contraction during the preparative process of less than about 10%. The final solid product can have a volume shrinkage on drying of, for example, less than about 10%.

In embodiments, the preparative method can have an intermediate reaction mixture comprising the alcoholyzed metal alkoxide and can further comprise the external addition of at least one additional polymerizable isocyanate monomer, of at least one additional polymerizable oligomeric isocyanate compound, or a combination thereof.

In embodiments, the disclosure provides a sol-gel polymer nanocomposite having interpenetrating networks comprising:

a sol-gel inorganic polymer network comprised of the product of a metal alkoxide and at least one of a diol, an alcohol, or a combination thereof; and a cross-linked organic polymer network comprised of the product of a polymerizable monomer having at least one isocyanate or a polymerizable oligomer having at least one isocyanate, a cross-linker, and a free-radical initiator, the cross-linked organic polymer network having at least one covalent bond to the sol-gel inorganic polymer network.

In embodiments, the nanocomposite of the disclosure can contain, for example, from about 10 to about 90 wt % sol-gel inorganic polymer; and from about 90 to about 10 wt % of the cross-linked organic polymer based on the total weight of the nanocomposite. In embodiments, the at least one covalent bond to the sol-gel inorganic polymer can be, for example, a plurality of bonds to the sol-gel inorganic polymer. The extent of covalent attachment between the inorganic polymer network and the organic polymer network can be selected, such as by selection of cross-linker and reactants, to render the networks in the resulting nanocomposite essentially inseparable by physical means. The sol-gel-polymer composite having interpenetrating networks of the disclosure is not believed to have any substantial or observable macroscopic surface boundary between the organic and inorganic components.

In embodiments, the disclosure provides a sol-gel-polymer nanocomposite comprising combining the respective products of:

a first reaction comprising a mixture comprised of a metal alkoxide and at least one of a diol, an alcohol, or a combination thereof; and a second reaction comprising the product of the first reaction and a mixture comprised of an unsaturated isocyanate, a cross-linker, and a free-radical initiator. The sol-gel-polymer nanocomposite prepared by the above process can further include, if desired or if necessary, drying the product of the second reaction until the solid has a constant weight and volume by, for example, continued heating, and with or without vacuum.

In embodiments, the preparative method of the disclosure can include, for example:

forming and heating a first mixture of the following:
a metal alkoxide of the formula $R_x$-M(OR$^1$)$_{4-x}$,
where M is Si, Ti, Al, Zr, or combination thereof,
R is a saturated or unsaturated hydrocarbyl group,
OR$^1$ is a hydrolyzable hydrocarbyloxy or alkoxy group with a molecular weight of less than about 200, and
x is 0 to 3; and
a glycol, an alcohol, or a combination thereof; and
adding to the first heated mixture and then heating, a second mixture comprising:
an polymerizable unsaturated isocyanate;
a cross-linking reagent; and
a free radical initiator.

In embodiments, the reaction mixture can be prepared in two steps. First, a metal alkoxide and the glycol or alcohol can be mixed with heating to give a transparent homogeneous solution. Next, the polymerizable isocyanate monomer is added and the mixture is heated to complete the polymerizable reaction and convert the isocyanate moieties to urethane moieties.

The resulting solid nanocomposite product does not contain, or is free-of, any liquid by-products and thus avoids having any product shrinkage attributable to liquid removal or evaporation.

Referring to the Figure, FIG. 1 schematically shows a nanocomposite comprised of a sol-gel inorganic polymer network as interconnected spheres (10), and a cross-linked organic polymer network as interconnected solid lines (20).

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the nanocomposites of the disclosure.

Test Methods

A. Structure/Homogeneity; SEM/AED

The samples were analyzed with a SEM-Jeol, analysis of AED was done with an AED Noran analyzer connected with the Jeol instrument. The probes were metallized with nickel (8 nm). The topographic contrast was 4 kV.

Density The density of each sample was determined by conventional Archimedean method. The sample weight in air and in deionized water was measured using a digital scale with an accuracy of 0.0001 gram. The volume of each sample was determined by liquid displacement. The final density was computed from the sample weight and sample volume.

B. Thermal/mechanical Properties

TGA/DTA was conducted on the composite samples using an STA 409C Netzsch instrument. All of the TGA measurements were conducted under an air environment (100 mL/min) with nitrogen purge. The samples were heated from 20° C. to 600° C. at 5° K/min. A two-point Curie Point Temperature Calibration with nickel and perkalloy were performed to verify the accuracy of the TGA system.

TMA Specimens were cut from flat sheets and scanned in the TMA TA Instruments Q400 (www.tainstruments.com) from 20° C. to 200° C. at 5° C./min.

CTE Measurement The coefficient of thermal expansion (CTE) was measured by the TMA method. Specimens were cut from flat sheets and scanned in the TMA TA Instruments Q400 from 20° C. to 200° C. at 5° C./min. although the direction of the method was perpendicular to the surface of the sample (X-Y), i.e., along Z-direction, The CTE was considered as a property for the entire bulk sample because of its uniformity isotropic nature.

Measuring the Amount of Inorganic Moiety

A portion of sample (e.g., 1 to 1.5 g) was weighted and heated in an oven at 600° C. for about 3 about 4 hours in air. The amount of inorganic moiety was the residual weight after heating.

Example 1

Metal oxide-glycol-acrylate urethane composite. The inner walls of a glass ampoule were hydrophobized with dichlorodimethylsilane (DCDMS) in dry decane. A transparent solution was prepared from the mixture of 1.4468 g (0.0088 mole) of tetraethoxysilane (TEOS) and 0.7855 g (0.0127 mole) of ethylene glycol (EG) by heating at 150° C. for 3 h. Then 0.0090 g of benzoyl peroxide (BP), 0.1690 g (0.0007 mole) of diethylene glycol diacrylate (DADEG) and 2.630 g (0.0170 mole) of 2-isocyanatoethyl methacrylate (ICEM) were added to the ampoule and sealed in air (mole ratios: TEOS:EG=1:1.83; TEOS:ICEM=1:2.44). After stirring the reaction mixture for 0.5 hour at ambient temperature, the solution was heated in an oven according to Example 1 schedule in Table 1.

TABLE 1

Heating Schedules.

| Example | Temp (° C.) | Time (h) |
|---|---|---|
| 1 | 50 | 16 |
|   | 60 | 20 |
|   | 80 | 15 |
|   | 100 | 6 |
|   | 120 | 15 |
|   | 135 | 3 |
| 2 | 100 | 24 |
|   | 120 | 25 |
|   | 135 | 15 |
|   | 150 | 2 |
| 3 | 48 | 14 |
|   | 50 | 10 |
|   | 60 | 8 |
|   | 80 | 10 |
|   | 100 | 3 |
|   | 120 | 12 |
|   | 135 | 2 |
| 4 | 50 | 24 |
|   | 60 | 15 |
|   | 80 | 9 |
|   | 100 | 10 |
|   | 120 | 15 |
|   | 150 | 2 |

The yield of the solid transparent product was 96.7 weight %. The SEM/AED observations of polished sections of sample surface showed high structural homogeneity on the nano-scale. No separate particles or different phase contrast was found. But the AED spectrum has shown the presence of Si after sample heating at 600° C. ($SiO_2$ particles). Physical properties of the organic-inorganic hybrid polymer were measured and are provided in Table 2.

TABLE 2

Physical properties of organic-inorganic hybrid polymers.

| Example | d (g/cm$^3$) | CTE (25-100° C.) $10^{-6°}$ C.$^{-1}$ | TGA/DSC data | | | Wt % inorganic moiety ($SiO_2$) |
|---|---|---|---|---|---|---|
| | | | Degradation Onset | Loss of mass between 30 and 200° C. | Residual mass @ 600° C. | |
| 1 | 1.31 | 185 | 250° C. | −7.13% | — | 9.38% |
| 2 | 1.24 | 175 | 245° C. | −7.89% | 13.83% | 9.50% |
| 3(a) | 1.22 | 225 | 262° C. | −6.20% | 7.63% | 4.68% |
| 3(b) | 1.21 | 199 | 269° C. | −3.48% | 6.08% | 3.39% |
| 3(c) | 1.21 | 208 | 254° C. | −2.06% | 5.03% | 3.40% |
| 4 | 1.23 | 170 | 265° C. | — | 11.5% | 8.89% |

Example 2

Metal oxide-glycol-alkylaryl urethane composite. The inner walls of a glass ampoule were hydrophobized with dichlorodimethylsilane (DCDMS) in dry decane. A transparent solution was prepared from the mixture of 1.7896 g (0.0086 mole) of tetraethoxysilane (TEOS) and 0.8008 g (0.0129 mole) of ethylene glycol (EG) by heating at 150° C. for 3 h. Then 0.1760 g of benzoyl peroxide (BP), 0.0342 g of dicumyl peroxide (DCP), 0.0197 g (0.0048 mole) of diethylene glycol diacrylate (DADEG) and 3.0288 g (0.0150 mole) of 3-isopropenyl-α,α-dimethylbenzyl isocyanate (IPBIC) were added to the ampoule and sealed in air (mole ratios: TEOS:EG=1:1.50; TEOS:IPBIC=1:1.34). After stirring the reaction mixture for 0.5 hour at ambient temperature, the solution was heated in an oven according the Example 2 schedule in Table 1. The yield of the solid transparent product was 96.2 weight %. Physical properties of the organic-inorganic hybrid polymer product were and measured are provided in Table 2.

Example 3

Metal oxide-glycol-urethane acrylate composite. The inner walls of three glass ampoules (3(a), 3(b), and 3(c)) were hydrophobized dichlorodimethylsilane (DCDMS) in dry decane. A transparent solution was prepared from a mixture of tetraethoxysilane (TEOS) and of ethylene glycol (EG) by its heating at 150° C. during 3 h. Then benzoyl peroxide (BP), diethylene glycol diacrylate (DADEG) and —NCO bearing aliphatic/aromatic urethane acrylates, such as DESMOLUXT™ VP LS 2396 and VP LS 2337, available from Bayer MaterialScience, were added to the ampoules and sealed in air. The following reagents were used to fill the respective ampoules:

Ampoule 3(a)
TEOS: 0.4268 g (0.0020 mole)
EG: 0.1914 g (0.0031 mole)
VP LS 2337: 1.4063 g
Mole ratios: TEOS:EG=1:1.50; TEOS:VP LS 2337=1:0.98
DADEG: 0.0242 g (0.0001 mole)
BP: 0.0070 g
Ampoule 3(b)
TEOS: 0.3198 g (0.0015 mole)
EG: 0.1434 g (0.0023 mole)
VP LS 2337: 1.5545 g
Mole ratios: TEOS:EG=1:1.50; TEOS:VP LS 2337=1:1.45
DADEG: 0.0276 g (0.0001 mole)
BP: 0.0080 g
Ampoule 3(c)
TEOS: 0.2578 g (0.0012 mole)
EG: 0.1156 g (0.0019 mole)
VP LS 2337: 1.6475 g
Mole ratios: TEOS:EG=1:1.50; TEOS:VP LS 2337=1:1.90
DADEG: 0.0309 g (0.0001 mole)
BP: 0.0080 g After stirring the reaction mixture for 0.5 hour at ambient temperature, the solution was heated in an oven according to the Example 3 schedule in Table 1. The yield of the solid transparent product in ampoules 3(a), 3(b), and 3(c), in weight percent was: 3(a)=95.4%; 3(b)=99.2%; and 3(c)=99.7%. Physical properties of the organic-inorganic hybrid polymers were measured and are provided in Table 2.

Metal oxide-glycol-urethane composite The inner surfaces of a glass ampoule were hydrophobized with dichlorodimethylsilane (DCDMS) in dry decane. A transparent solution was prepared from the mixture of 2.0477 g (0.0082 mole) of 3-(trimethoxysilylpropyl)methacrylate (TMSPM) of 0.5079 g (0.0082 mole) of ethylene glycol (EG) by its heating at 100° C. during 1 h. Then 0.0088 g of benzoyl peroxide (BP), 0.2017 g (0.0008 mole) of diethylene glycol dimethacrylate (DMDEG) and 2.6327 g (0.0170 mole) of 2-isocyanatoethyl methacrylate (ICEM) were added to the ampoule and sealed in air (mole ratios: TMSPM:EG=1:1.00; TMSPM:ICEM=1: 2.06). After stirring the reaction mixture for 0.5 hour at ambient temperature, the solution was heated in an oven according to the Example 4 schedule in Table 1. The yield of the solid transparent product was 98.9 weight %. Physical properties of the organic-inorganic hybrid polymer were measured and are provided in Table 2.

Example 4

Metal oxide-glycol-urethane composite The inner surfaces of a glass ampoule were hydrophobized with dichlorodimethylsilane (DCDMS) in dry decane. A transparent solution was prepared from the mixture of 2.0477 g (0.0082 mole) of 3-(trimethoxysilylpropyl)methacrylate (TMSPM) and 0.5079 g (0.0082 mole) of ethylene glycol (EG), and with heating at 100° C. for 1 h. Then 0.0088 g of benzoyl peroxide (BP), 0.2017 g (0.0008 mole) of diethylene glycol dimethacrylate (DMDEG), and 2.6327 g (0.0170 mole) of 2-isocyanatoethyl methacrylate (ICEM) were added to the ampoule and sealed in air (relative mole ratios: TMSPM: EG=1:1.00; TMSPM:ICEM=1:2.06). After stirring the reaction mixture for 0.5 hour at ambient temperature, the solution was heated in an oven according to the schedule in Table 1 for Example 4. The yield of the solid transparent product was 98.9 weight %. Physical properties of the organic-inorganic hybrid polymer were measured and are provided in Table 2.

Comparative Example 5

Preparation of a cross-linked pure polymer: polyethylmethacrylate (PEMA). As in the foregoing examples, an organic monomer was polymerized with the exception that no metal oxide source was included in the reaction mixture. The inner walls of a glass ampoule were hydrophobized with dichlorodimethylsilane (DCDMS) in dry decane. A transparent solution was prepared from the mixture of 10.7801 g (0.0944 mole) of ethylmethacrylate (EMA) and 0.0676 g of benzoyl peroxide (BP) and of 0.0346 g of dicumyl peroxide (DCP) at ambient temperature. Then the solution was heated in an oven according to the schedule in Table 1 for Example 1. Some physical properties of the crosslinked polyethylmethacrylate polymer product were compared with the organic-inorganic hybrid polymers of Example 1 and 4 and are listed in Table 3.

TABLE 3

Comparison of hybrid polymers with model polymer.

| Example | d (g/cm$^3$) | CTE (25-100° C.) 10$^{-6}$° C.$^{-1}$ | Start of degradation | Loss of mass between 30 and 200° C. | Residual mass @ 600° C. | Amount of inorganic moiety (SiO$_2$) | Hardness (DIN 53505; ISO R868) |
|---|---|---|---|---|---|---|---|
| | | | TGA/DSC data | | | | |
| | | | Comparative polymer model | | | | |
| 5(PEMA) | 1.20 | 144 | 202 | — | — | 0.00% | 80 |
| | | | Organic-inorganic hybrids | | | | |
| 1 | 1.31 | 185 | 250° C. | −7.13% | — | 9.38% | 75 |
| 4 | 1.23 | 170 | 265° C. | — | 11.5% | 8.89% | 84 |

Other supportive characterization of the disclosed and prepared composite materials included, for example, hardness, scratch resistance, and porosity.

The disclosure has been described with reference to various specific embodiments and techniques. However, it should be understood that many variations and modifications are possible while remaining within the spirit and scope of the disclosure.

What is claimed is:

1. A method for making a composite comprising:
a first heating of a first mixture comprising:
   i) a metal alkoxide of the formula $R_x\text{-M(OR}^1)_{m-x}$,
   where
   M is Si, Ti, Ta, Sn, Al, Zr, Hf, or a combination thereof,
   R, if present, is a substituted or unsubstituted, saturated or unsaturated, hydrocarbyl group having from 1 to about 10 carbon atoms,
   $OR^1$ is each independently an alcoholyzable hydrocarbyloxy group having from 1 to about 10 carbon atoms,
   x is 0 to 5, and
   m is 1 to 5, and
   ii) a diol of the formula HO—$R^2$—OH, an alcohol of the formula HO—$R^3$, or
a mixture thereof,
where
   $R^2$ is a divalent substituted or unsubstituted hydrocarbylene having from 1 to about 10 carbon atoms, or an oligomeric or polymeric group comprising at least one chain incorporating a plurality of alkoxyl groups, urethane groups, carbonate groups, or a combination thereof;
   $R^3$ is an unsaturated and polymerizable hydrocarbyl having from 3 to about 18 carbon atoms; and
combining a monomer having at least one unsaturated isocyanate or a polymerizable oligomer having at least one isocyanate, a cross-linker, and a free radical initiator, and the product of the heated first mixture, and performing a second heating to form the composite.

2. The method of claim 1 wherein the first heating is accomplished at from about 50 to about 150 degrees C., for about 0.5 to about 5 hours, and the second heating is accomplished at an increasing temperature of from about 45 to about 150 degrees C., over a period of for about 20 to about 100 hours.

3. The method of claim 1 wherein:
the metal alkoxide comprises at least one of 3-(trialkoxysilylpropyl) methacrylate, 3-(trialkoxysilylpropyl)acrylate, trialkoxyvinylsilane, styrylethyltrialkoxysilane, tetraalkoxysilane, titanium alkoxide, aluminum trialkoxide, tin tert-alkoxide, hafnium alkoxide, tantalum alkoxide, zirconium alkoxide, or a combination thereof;
the diol HO—$R^2$—OH comprises at least one of an alkylene glycol, a propylene glycol, a poly(alkylene glycol), a polyurethane diol, a polycarbonate, a bisphenol, an alkoxylated bisphenol diol, or a combination thereof;
the alcohol HO—$R^3$ comprises at least one of 2-hydroxyethyl acrylate (HEA), 2-hydroxyethyl methacrylate (HEMA), or a combination thereof; and
the unsaturated isocyanate monomer, having at least one isocyanate or an oligomeric unsaturated isocyanate monomer having at least one isocyanate, comprises at least one of an aliphatic isocyanate containing an acrylate, an aromatic isocyanate containing an acrylate, or a combination thereof.

4. The method of claim 1 wherein:
the cross-linker comprises at least one of a dialkylene glycol diacrylate, dialkylene glycol dimethacrylate, a trimethylolpropane alkoxylate triacrylate, divinylbenzene, or a combination thereof; and
the free-radical initiator comprises at least one of a thermopolymerization initiator, a photopolymerization initiator, or a combination thereof.

5. The method of claim 1 wherein the first heating and second heating being accomplished free of any added solvent or diluent, and in a single vessel.

6. The method of claim 1 wherein the first heating provides a transparent solution, and the alkoxide —$OR^1$ of the metal alkoxide includes a free-radical polymerizable moiety.

7. The method of claim 1 wherein the composite is free of shrinking, cracking, or a combination thereof.

8. The method of claim 1 wherein the second heating being accomplished until the solid product has a constant weight.

9. A sol-gel polymer nanocomposite having interpenetrating networks comprising:
a sol-gel inorganic polymer network comprised of the product of a metal alkoxide and at least one of a diol, an alcohol, or a combination thereof; and
a cross-linked organic polymer network comprised of the product of a polymerizable monomer having at least one isocyanate or a polymerizable oligomer having at least one isocyanate, a cross-linker, and a free-radical initiator, the cross-linked organic polymer network having at least one covalent bond to the sol-gel inorganic polymer network.

10. The composite of claim 9 wherein organic polymer network has at least one covalent bond to the sol-gel inorganic polymer; the sol-gel inorganic polymer comprises from about 10 to about 90 wt %; and the cross-linked organic polymer comprises from about 90 to about 10 wt % based on the total weight of the composite.

11. A sol-gel-polymer composite by the method according to claim 1.

12. The composite of claim 11 further comprising drying the product of the second reaction until the resulting solid has a constant weight and volume.

13. The composite of claim 11 wherein the composite is transparent.

* * * * *